United States Patent
Hwang

(10) Patent No.: US 8,810,569 B2
(45) Date of Patent: Aug. 19, 2014

(54) IMAGE DISPLAY DEVICE CAPABLE OF SWITCHING 2D MODE AND 3D MODE

(75) Inventor: Kwangjo Hwang, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 124 days.

(21) Appl. No.: 13/334,778

(22) Filed: Dec. 22, 2011

(65) Prior Publication Data
US 2012/0280979 A1 Nov. 8, 2012

(30) Foreign Application Priority Data
May 6, 2011 (KR) .................. 10-2011-0042969

(51) Int. Cl.
G06T 15/00 (2011.01)
G09G 3/00 (2006.01)
H04N 13/04 (2006.01)
G02B 27/26 (2006.01)

(52) U.S. Cl.
CPC ......... *H04N 13/0434* (2013.01); *G06G 3/3648* (2013.01); *G09G 3/003* (2013.01); *H04N 13/0454* (2013.01); *H04N 13/0497* (2013.01); *G09G 2310/0251* (2013.01); *G09G 2300/0443* (2013.01); *G02B 27/26* (2013.01)
USPC ............. 345/419; 345/204; 359/465

(58) Field of Classification Search
USPC ............. 345/419; 359/462, 464, 465
See application file for complete search history.

(56) References Cited

U.S. PATENT DOCUMENTS

| | | | |
|---|---|---|---|
| 8,107,032 B2 * | 1/2012 | Tsubata | 349/48 |
| 2007/0171168 A1 * | 7/2007 | Park et al. | 345/92 |
| 2010/0026921 A1 | 2/2010 | Tsubata | |
| 2010/0238148 A1 * | 9/2010 | Sah | 345/206 |
| 2010/0289884 A1 | 11/2010 | Kang | |
| 2011/0216277 A1 * | 9/2011 | Chen et al. | 349/117 |
| 2011/0234605 A1 * | 9/2011 | Smith et al. | 345/522 |
| 2012/0050261 A1 * | 3/2012 | Feng et al. | 345/419 |

FOREIGN PATENT DOCUMENTS

| | | |
|---|---|---|
| CN | 101008755 A | 8/2007 |
| CN | 101512628 A | 8/2009 |
| CN | 101888564 A | 11/2010 |
| JP | 2002-185983 A | 6/2002 |

OTHER PUBLICATIONS

The First Office Action dated Feb. 7, 2014 from The State Intellectual Property Office of the People's Republic of China in counterpart Chinese application No. 201110461249.9.

* cited by examiner

*Primary Examiner* — Sumati Lefkowitz
*Assistant Examiner* — Robin Mak
(74) *Attorney, Agent, or Firm* — Morgan, Lewis & Bockius LLP

(57) ABSTRACT

An image display device includes a display panel which includes a plurality of subpixels and selectively displays a 2D image and a 3D image, a patterned retarder for dividing light from the display panel into first polarized light and second polarized light, and a control voltage generator, which generates a first DC control voltage of an OFF-level and a second DC control voltage of a slight-on level, which is higher than the OFF-level and is lower than a full-on level, and selectively outputs the first DC control voltage and the second DC control voltage depending on a driving mode.

8 Claims, 15 Drawing Sheets

IMAGE DISPLAY DEVICE CAPABLE OF SWITCHING 2D MODE AND 3D MODE

This application claims the benefit of Korean Patent Application No. 10-2011-0042969 filed on May 6, 2011, which is incorporated herein by reference for all purposes as if fully set forth herein.

BACKGROUND OF THE INVENTION

1. Field of the Invention

Embodiments of the invention relate to an image display device capable of selectively implementing a two-dimensional plane image (hereinafter referred to as '2D image') and a three-dimensional stereoscopic image (hereinafter referred to as '3D image').

2. Discussion of the Related Art

Recently, an image display device may selectively implement a 2D image and a 3D image due to the development of various contents and circuit technology. The image display device implements the 3D image using a stereoscopic technique or an autostereoscopic technique.

The stereoscopic technique, which uses a parallax image between left and right eyes of a user with a high stereoscopic effect, includes a glasses type method and a non-glasses type method, both of which have been put to practical use. In the non-glasses type method, an optical plate such as a parallax barrier for separating an optical axis of the parallax image between the left and right eyes is generally installed in front of or behind a display screen. In the glasses type method, left and right eye images each having a different polarization direction are displayed on a display panel, and a stereoscopic image is implemented using polarized glasses or liquid crystal (LC) shutter glasses.

An LC shutter glasses type image display alternately displays a left eye image and a right eye image on a display element every one frame and opens and closes a left eyeglass and a right eyeglass of LC shutter glasses in synchronization with a display timing, thereby implementing the 3D image. The LC shutter glasses open only the left eyeglass during odd-numbered frame periods, in which the left eye image is displayed, and open only the right eyeglass during even-numbered frame periods, in which the right eye image is displayed, thereby making binocular disparity in a time division method. In the LC shutter glasses type image display, because the LC shutter glasses are turned on in a short period of time, a luminance of the 3D image is low. Further, a 3D crosstalk is extremely generated because of the synchronization between the display element and the LC shutter glasses and the ON/OFF conversion response characteristic.

As shown in FIG. 1, a polarized glasses type image display includes a patterned retarder 2 attached to a display panel 1. The polarized glasses type image display alternately displays left eye image data L and right eye image data R on the display panel 1 every one horizontal line and converts polarization characteristics of light incident on polarized glasses 3 using the patterned retarder 2. Through such an operation of the polarized glasses type image display, a left eye image and a right eye image may be spatially divided, thereby implementing a 3D image.

In the polarized glasses type image display, because the left eye image and the right eye image are adjacently displayed on the adjacent horizontal lines of the display panel 1, a range of a vertical viewing angle, in which a crosstalk is not generated, is very narrow. The crosstalk is generated when a doubled image of the left eye image and the right eye image is displayed at a location of the vertical viewing angle. To prevent the crosstalk in the polarized glasses type image display, as shown in FIG. 2, a method for forming black stripes BS in an area of a patterned retarder 2 to thereby widen a vertical viewing angle of the 3D image had been proposed in Japanese Laid Open Publication No. 2002-185983. However, the black stripes BS of the patterned retarder 2 used to widen the vertical viewing angle cause side effects resulting in a large reduction in a luminance of a 2D image.

SUMMARY OF THE INVENTION

Embodiments of the invention provide an image display device capable of widening a vertical viewing angle of a 3D image without a reduction in a luminance of a 2D image.

In one aspect, there is an image display device including a display panel configured to selectively display a 2D image and a 3D image, the display panel including a plurality of subpixels, a patterned retarder configured to divide light from the display panel into first polarized light and second polarized light, and a control voltage generator configured to generate a first DC control voltage of an OFF-level and a second DC control voltage of a slight-on level, which is higher than the OFF-level and is lower than a full-on level, and selectively output the first DC control voltage and the second DC control voltage depending on a driving mode, wherein each of the plurality of subpixels includes a main display unit including a first pixel electrode connected to a data line through a first switch and a first common electrode which is opposite to the first pixel electrode and is connected to a common line, and an auxiliary display unit including a second pixel electrode connected to the data line through a second switch, a second common electrode which is opposite to the second pixel electrode and is connected to the common line, and a discharge control switch which selectively connects the second pixel electrode to the common line depending on the driving mode, wherein the discharge control switch is turned off by the first DC control voltage in a 2D mode for implementing the 2D image and is slightly turned on by the second DC control voltage in a 3D mode for implementing the 3D image.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Exemplary embodiments of the invention will be described with reference to FIGS. 3 to 18.

Figure 1:
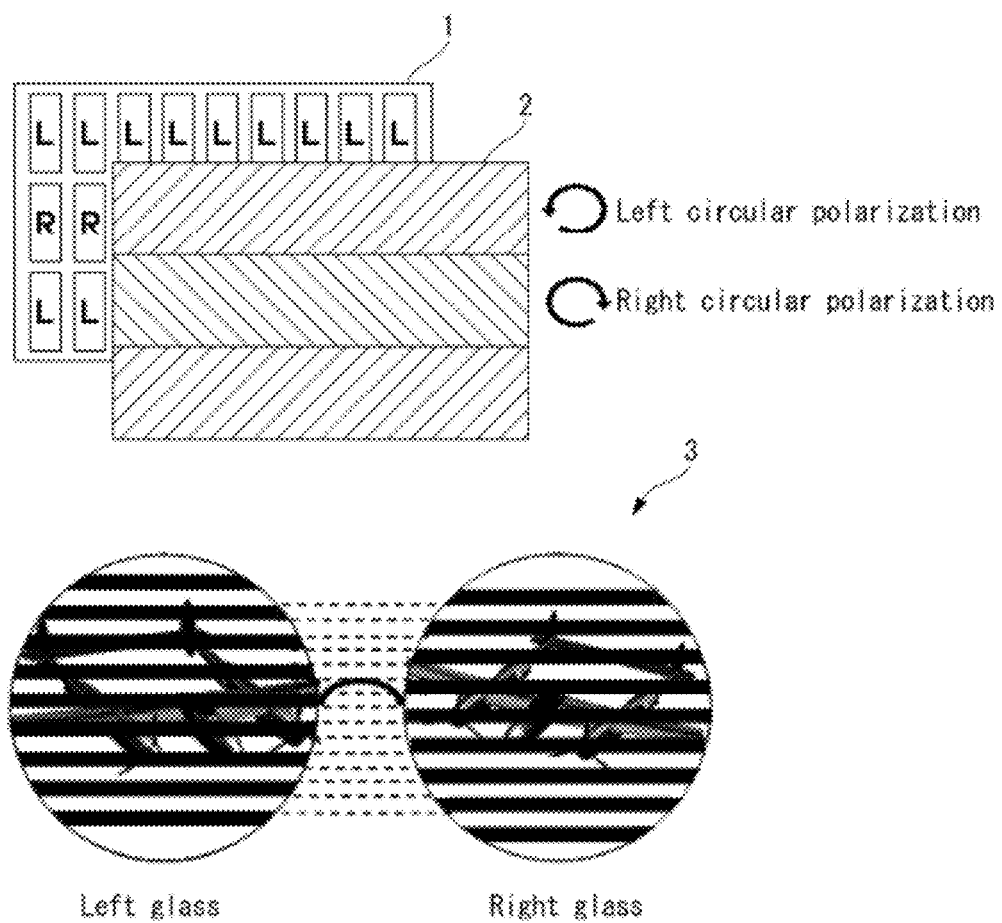
FIG. 1 illustrates a related art polarized glasses type image display.
Figure 2:
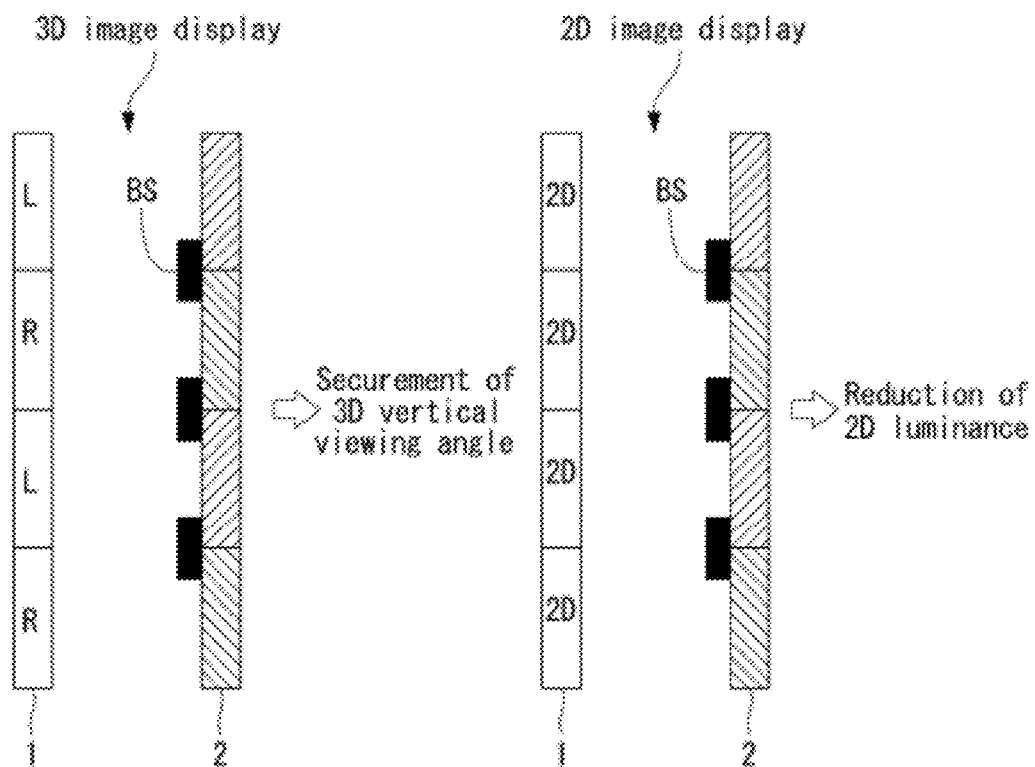
FIG. 2 illustrates that a luminance of a 2D image is reduced by black stripes used to widen a vertical viewing angle in a related art polarized glasses type image display.
Figure 3:
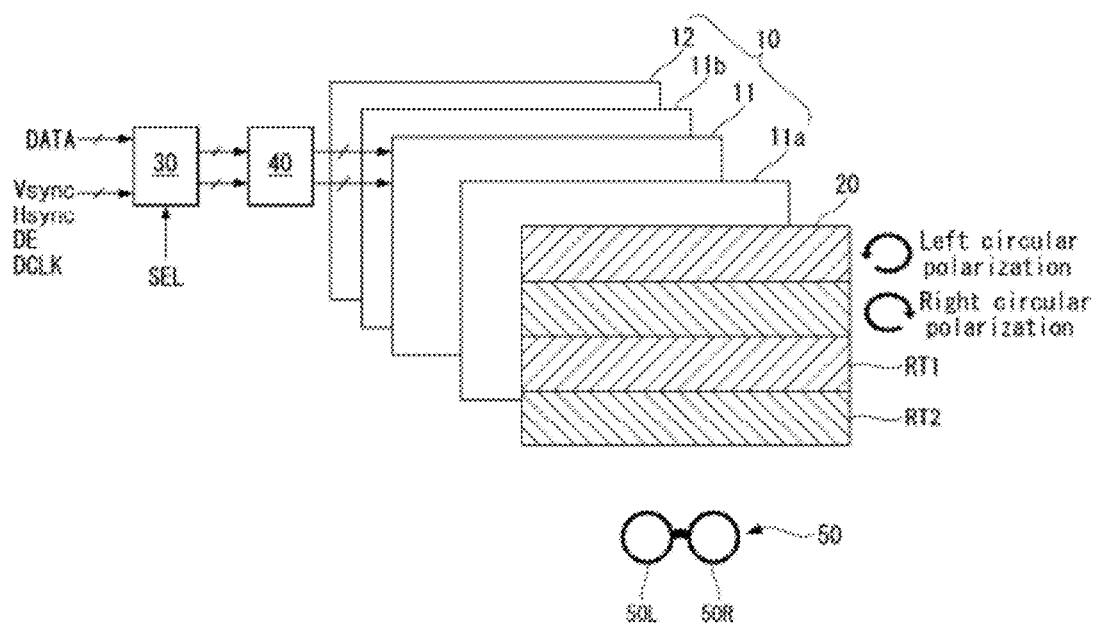
FIGS. 3 and 4 illustrate a polarized glasses type image display according to an exemplary embodiment of the invention.
Figure 4:
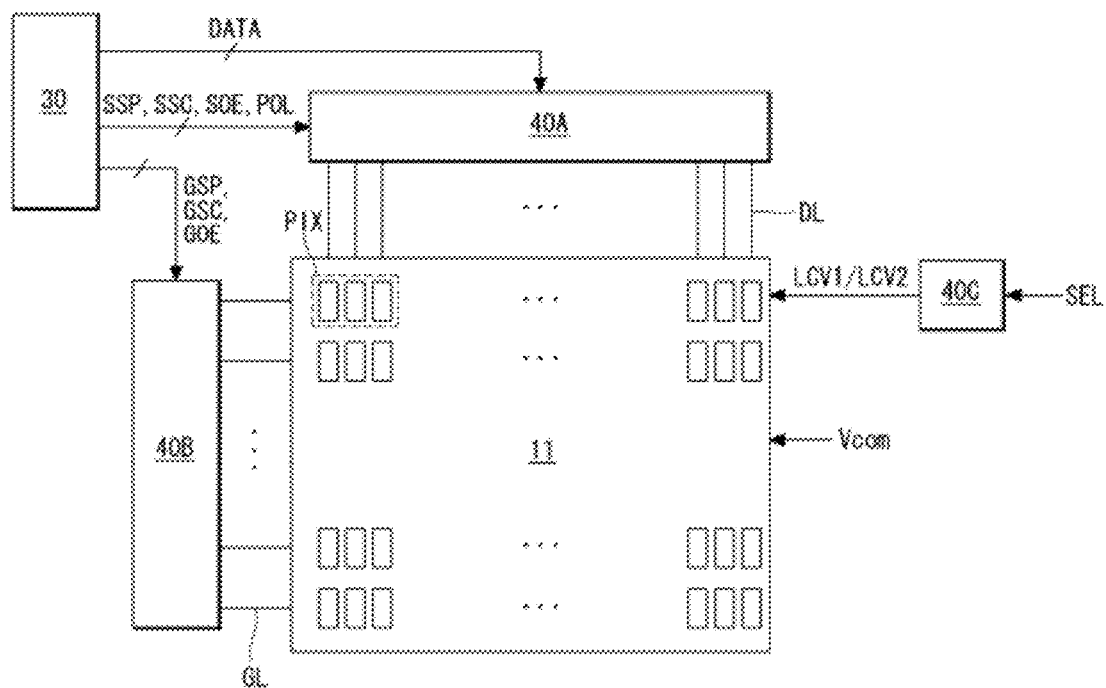

FIGS. 3 and 4 illustrate a polarized glasses type image display according to an exemplary embodiment of the invention.

As shown in FIGS. 3 and 4, the image display device according to the embodiment of the invention includes a display element 10, a patterned retarder 20, a controller 30, a panel driver 40, and polarized glasses 50.

The display element 10 may be implemented as a flat panel display such as a liquid crystal display (LCD), a field emission display (FED), a plasma display panel (PDP) display, an electroluminescence device (EL) including an inorganic electroluminescence element and an organic light emitting diode (OLED), and an electrophoretic display (EPD). In the following description, the image display device according to the embodiment of the invention is described using the liquid crystal display as the display element 10.

The display element 10 includes a display panel 11, an upper polarizing film 11a, and a lower polarizing film 11b.

The display panel 11 includes an upper glass substrate, a lower glass substrate, and a liquid crystal layer between the upper and lower glass substrates. A plurality of data lines DL and a plurality of gate lines GL crossing the plurality of data lines DL are disposed on the lower glass substrate of the display panel 11. A plurality of unit subpixels PIX are disposed on the display panel 11 in a matrix form based on a crossing structure between the data lines DL and the gate lines GL, thereby constituting a pixel array. Common lines, to which a common voltage Vcom is supplied, and discharge control lines, to which first and second DC control voltages LCV1 and LCV2 are supplied, are formed on the lower glass substrate of the display panel 11. Black matrixes, color filters, and common electrodes are formed on the upper glass substrate of the display panel 11.

The upper polarizing film 11a is attached to the upper glass substrate of the display panel 11, and the lower polarizing film 11b is attached to the lower glass substrate of the display panel 11. Alignment layers for setting a pre-tilt angle of liquid crystals are respectively formed on the upper and lower glass substrates of the display panel 11. In a vertical electric field driving manner such as a twisted nematic (TN) mode and a vertical alignment (VA) mode, the common electrodes are formed on the upper glass substrate. In a horizontal electric field driving manner such as an in-plane switching (IPS) mode and a fringe field switching (FFS) mode, the common electrodes are formed on the lower glass substrate along with pixel electrodes. A column spacer may be formed between the upper and lower glass substrates to keep cell gaps of the liquid crystal cells of the display panel 11 constant.

The display element 10 according to the embodiment of the invention may be implemented as any type liquid crystal display including a backlit liquid crystal display, a transflective liquid crystal display, and a reflective liquid crystal display. A backlight unit 12 is necessary in the backlit liquid crystal display and the transflective liquid crystal display. The backlight unit 12 may be implemented as a direct type backlight unit or an edge type backlight unit.

The patterned retarder 20 is attached to the upper polarizing film 11a of the display panel 11. The patterned retarder 20 includes a plurality of first retarders RT1, which are respectively formed on odd-numbered lines of the patterned retarder 20, and a plurality of second retarders RT2, which are respectively formed on even-numbered lines of the patterned retarder 20. Light absorption axes of the first retarders RT1 are different from light absorption axes of the second retarders RT2. The first retarders RT1 are opposite to odd-numbered pixel lines of the pixel array, and the second retarders RT2 are opposite to even-numbered pixel lines of the pixel array. The first retarders RT1 retard a phase of linearly polarized light incident through the upper polarizing film 11a by quarter wavelength and transmit it as first polarized light (for example, left-circularly polarized light). The second retarders RT2 retard a phase of linearly polarized light incident through the upper polarizing film 11a by quarter wavelength and transmit it as second polarized light (for example, right-circularly polarized light).

The controller 30 controls an operation of the panel driver 40 in a 2D mode and a 3D mode in response to a mode selection signal SEL. The controller 30 receives the mode selection signal SEL through a user interface such as a touch screen, an on-screen display (OSD), a keyboard, a mouse, and a remote controller. The controller 30 may switch between an operation of the 2D mode and an operation of the 3D mode in response to the mode selection signal SEL. The controller 30 detects a 2D/3D identification code encoded to data of an input image, for example, a 2D/3D identification code capable of being coded to an electronic program guide (EPG) or an electronic service guide (ESG) of a digital broadcasting standard, thereby distinguishing between the 2D mode and the 3D mode.

In the 3D mode, the controller 30 divides 3D image data received from a video source into RGB data of a left eye image and RGB data of a right eye image. Then, the controller 30 alternately supplies the RGB data of the left eye image corresponding to one horizontal line and the RGB data of the right eye image corresponding to one horizontal line to the panel driver 40. In the 2D mode, the controller 30 sequentially supplies RGB data of a 2D image received from the video source to the panel driver 40.

The controller 30 generates control signals for controlling operation timing of the panel driver 40 using timing signals such as a vertical sync signal Vsync, a horizontal sync signal Hsync, a data enable DE, and a dot clock DCLK.

A data control signal for controlling operation timing of a data driver 40A of the panel driver 40 includes a source start pulse SSP, a source sampling clock SSC, a source output enable SOE, a polarity control signal POL, and the like. The source start pulse SSP indicates a supply start time point of data corresponding to one horizontal line in one horizontal period during which the data corresponding to the one horizontal line is displayed. The source sampling clock SSC controls a latch operation of data based on a rising or falling edge thereof. The source output enable SOE controls an output of the data driver 40A. The polarity control signal POL controls a polarity of a data voltage to be supplied to the liquid crystal cells of the display panel 11.

A gate control signal for controlling operation timing of a gate driver 40B of the panel driver 40 includes a gate start pulse GSP, a gate shift clock GSC, a gate output enable GOE, and the like. The gate start pulse GSP indicates a start horizontal line of a scan operation in one vertical period during which one screen is displayed. The gate shift clock GSC is input to a shift register inside the gate driver 40B and sequentially shifts the gate start pulse GSP. The gate output enable GOE controls an output of the gate driver 40B.

The controller 30 multiplies the frequency of the timing signals Vsync, Hsync, DE, and DCLK synchronized with an input frame frequency by N to obtain a frame frequency of (f×N) Hz, where N is a positive integer equal to or greater than 2 and f is the input frame frequency. Hence, the controller 30 may control the operation of the panel driver 40 based on the frame frequency of (f×N) Hz. The input frame frequency is 50 Hz in a phase alternate line (PAL) scheme and 60 Hz in a national television standards committee (NTSC) scheme.

The panel driver 40 includes the data driver 40A for driving the data lines DL of the display panel 11, the gate driver 40B for driving the gate lines GL of the display panel 11, and a control voltage generator 40C for driving the discharge control lines of the display panel 11.

The data driver 40A includes a plurality of source driver integrated circuits (ICs). Each of the source driver ICs includes a shift register, a latch, a digital-to-analog converter (DAC), an output buffer, etc. The data driver 40A latches the RGB data of the 2D or 3D image in response to the data control signals SSP, SSC, and SOE. The data driver 40A converts the RGB data of the 2D/3D image into analog positive and negative gamma compensation voltages in response to the polarity control signal POL and inverts a polarity of the data voltage. The data driver 40A outputs the data voltage to the data lines DL, so that the data voltage is synchronized with a scan pulse (or a gate pulse) output from the gate driver 40B. The source driver ICs of the data driver 40A may be bonded to the lower glass substrate of the display panel 11 through a tape automated bonding (TAB) process.

The gate driver 40B generates the scan pulse, which swings between a gate high voltage and a gate low voltage, in response to the gate control signals GSP, GSC, and GOE. The gate driver 40B supplies the scan pulse to the gate lines GL in a line sequential format in response to the gate control signals GSP, GSC, and GOE. The gate driver 40B includes a gate shift register array, etc. The gate shift register array of the gate driver 40B may be formed in a non-display area outside a display area of the display panel 11, in which the pixel array is formed, in a gate-in-panel (GIP) manner. A plurality of gate shift registers included in the gate shift register array may be formed with along the pixel array in a thin film transistor (TFT) process of the pixel array in the GIP manner.

The control voltage generator 40C generates the first DC control voltage LCV1 and the second DC control voltage LCV2 and selectively supplies the first DC control voltage LCV1 and the second DC control voltage LCV2 to the discharge control lines in response to the mode selection signal SEL. The first DC control voltage LCV1 is generated at an OFF-level, and the second DC control voltage LCV2 is generated at a slight-on level, which is higher than the OFF-level and is lower than a full-on level. Further, the second DC control voltage LCV2 is at a voltage level higher than the common voltage Vcom. The first DC control voltage LCV1 and the second DC control voltage LCV2 are applied to a gate electrode of a discharge control switch DST shown in FIG. 8 and thus switch on or off a current path operation of the discharge control switch DST.

The polarized glasses 50 include a left eyeglass 50L having a left eye polarizing filter and a right eyeglass 50R having a right eye polarizing filter. The left eye polarizing filter has the same light absorption axis as the first retarder RT1 of the patterned retarder 20, and the right eye polarizing filter has the same light absorption axis as the second retarder RT2 of the patterned retarder 20. For example, a left circular polarizing filter may be selected as the left eye polarizing filter of the polarized glasses 50, and a right circular polarizing filter may be selected as the right eye polarizing filter of the polarized glasses 50. A user may view the 3D image, which is displayed on the display element 10 in a spatial division manner, through the polarized glasses 50.

Figure 5:
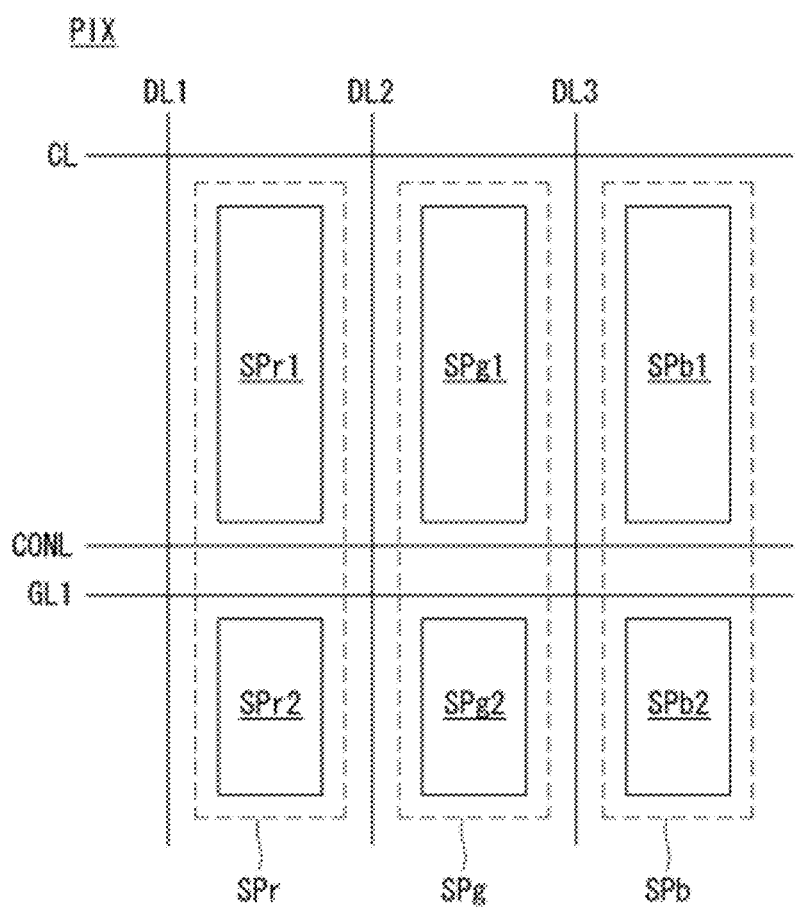
FIG. 5 illustrates one of a plurality of unit pixels shown in FIG. 4.

FIG. 5 illustrates one of the plurality of unit pixels PIX shown in FIG. 4.

As shown in FIG. 5, the unit pixel PIX includes a red (R) subpixel SPr, a green (G) subpixel SPg, and a blue (B) subpixel SPb.

The R subpixel SPr includes an R main display unit SPr1 and an R auxiliary display unit SPr2 with a first gate line GL1 and a discharge control line CONL interposed between them. The R main display unit SPr1 and the R auxiliary display unit SPr2 are electrically connected to a first data line DL1 when the gate high voltage is applied to the first gate line GL1. The R auxiliary display unit SPr2 is electrically connected to a common line CL when the second DC control voltage LCV2 is applied to the discharge control line CONL.

The G subpixel SPg includes a G main display unit SPg1 and a G auxiliary display unit SPg2 with the first gate line GL1 and the discharge control line CONL interposed between them. The G main display unit SPg1 and the G auxiliary display unit SPg2 are electrically connected to a second data line DL2 when the gate high voltage is applied to the first gate line GL1. The G auxiliary display unit SPg2 is electrically connected to the common line CL when the second DC control voltage LCV2 is applied to the discharge control line CONL.

The B subpixel SPb includes a B main display unit SPb1 and a B auxiliary display unit SPb2 with the first gate line GL1 and the discharge control line CONL interposed between them. The B main display unit SPb1 and the B auxiliary display unit SPb2 are electrically connected to a third data line DL3 when the gate high voltage is applied to the first gate line GL1. The B auxiliary display unit SPb2 is electrically connected to the common line CL when the second DC control voltage LCV2 is applied to the discharge control line CONL.

In the 2D mode, the auxiliary display units SPr2, SPg2, and SPb2 display the same 2D image as the main display units SPr1, SPg1, and SPb1. On the other hand, in the 3D mode, the auxiliary display units SPr2, SPg2, and SPb2 display a black image differently from the main display units SPr1, SPg1, and SPb1. Hence, the auxiliary display units SPr2, SPg2, and SPb2 widen a vertical viewing angle of the 3D image without a reduction in a luminance of the 2D image.

Figure 6:
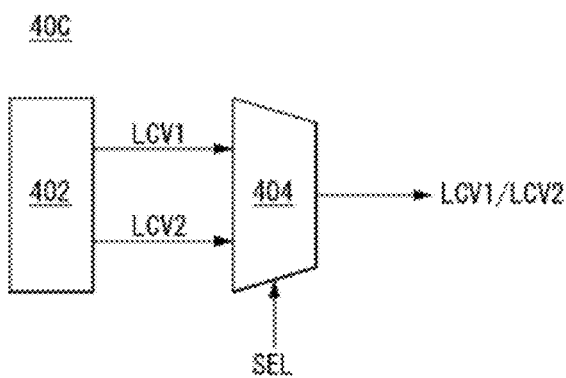
FIG. 6 illustrates a detailed configuration of a control voltage generator shown in FIG. 4.
Figure 7:
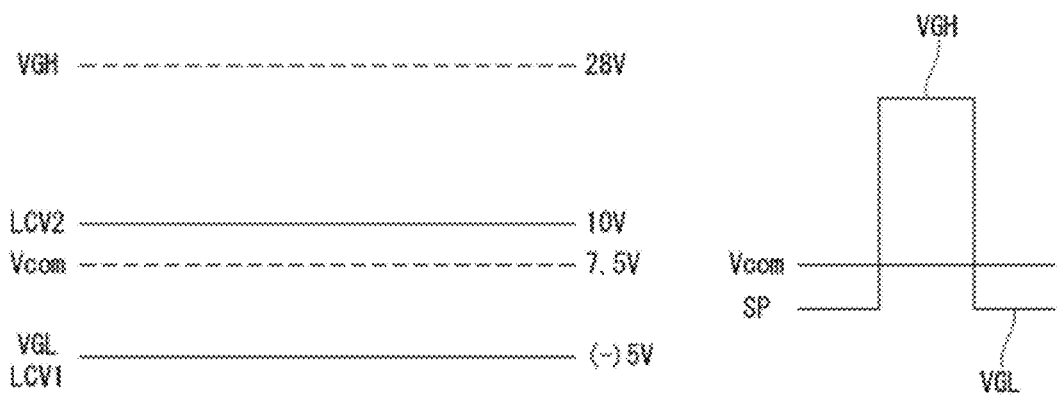
FIG. 7 illustrates levels of first and second control voltages.

FIG. 6 illustrates a detailed configuration of the control voltage generator 40C shown in FIG. 4. FIG. 7 illustrates levels of first and second control voltages.

As shown in FIG. 6, the control voltage generator 40C includes a DC-DC generator 402 and a multiplexer 404.

The DC-DC generator 402 generates the first DC control voltage LCV1 and the second DC control voltage LCV2 using an input DC power source.

As shown in FIG. 7, the first DC control voltage LCV1 may be generated at the same voltage level as a gate low voltage VGL of a scan pulse SP. When the gate low voltage VGL of the scan pulse SP capable of turning off a switch (ST1 or ST2 of FIG. 8) is about −5V, the first DC control voltage LCV1 may be about −5V or less.

As shown in FIG. 7, the second DC control voltage LCV2 may be generated at a voltage level, which is greater than the common voltage Vcom and is less than a gate high voltage VGH of the scan pulse SP. Thus, the second DC control voltage LCV2 may have a proper voltage level between the gate high voltage VGH and the common voltage Vcom, so that it can held an ON-state of the discharge control switch DST at a slight-on level. When the common voltage Vcom is about 7.5V and the gate high voltage VGH of the scan pulse SP capable of fully turning on the switch (ST1 or ST2 of FIG. 8) is about 28V, the second DC control voltage LCV2 may be about 8V to 12V, preferably, about 10V.

The multiplexer 404 selectively outputs the first DC control voltage LCV1 and the second DC control voltage LCV2 to the discharge control line in response to the mode selection signal SEL. The multiplexer 404 outputs the first DC control voltage LCV1 in the 2D mode and outputs the second DC control voltage LCV2 in the 3D mode The first and second DC control voltages LCV1 and LCV2 control the operation of the discharge control switch DST. A reason to use the first and second DC control voltages LCV1 and LCV2 to control the operation of the discharge control switch DST is to remove side effects caused by a kick-back voltage illustrated in FIGS. 16 to 18. The kick-back voltage indicates a voltage shift amount ΔVP when a pixel voltage of a liquid crystal (LC) capacitor is not held at a charge level (or a discharge level) at a time when the switch connected to the liquid crystal (LC) capacitor is converted from a turn-on state to a turn-off state and is shifted by ΔVP. A reason why the kick-back voltage is generated is because the control voltage applied to a gate electrode of the switch has a pulse form. A magnitude of the kick-back voltage is proportional to a gate-source parasitic resistance of the switch and a difference between a gate-on voltage and a gate-off voltage of the switch.

Figure 8:
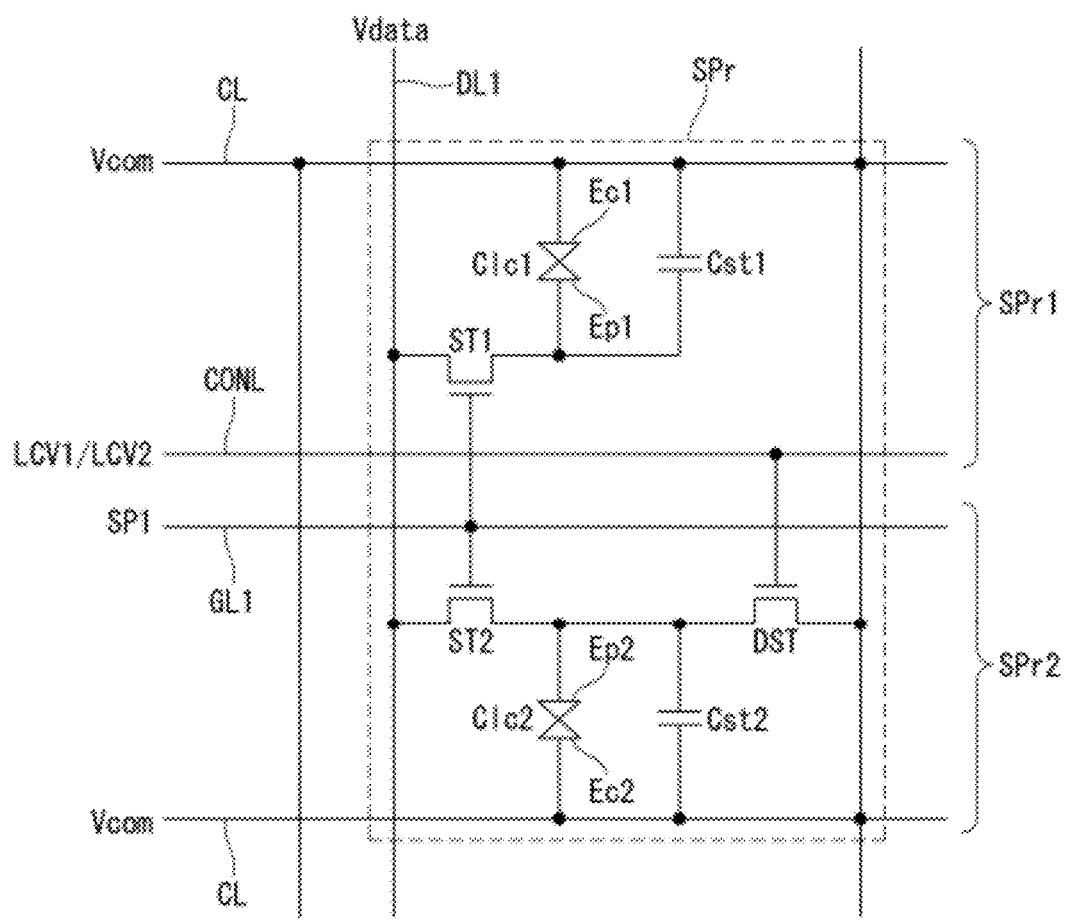
FIG. 8 illustrates a connection configuration of a red subpixel shown in FIG. 5.
Figure 9:
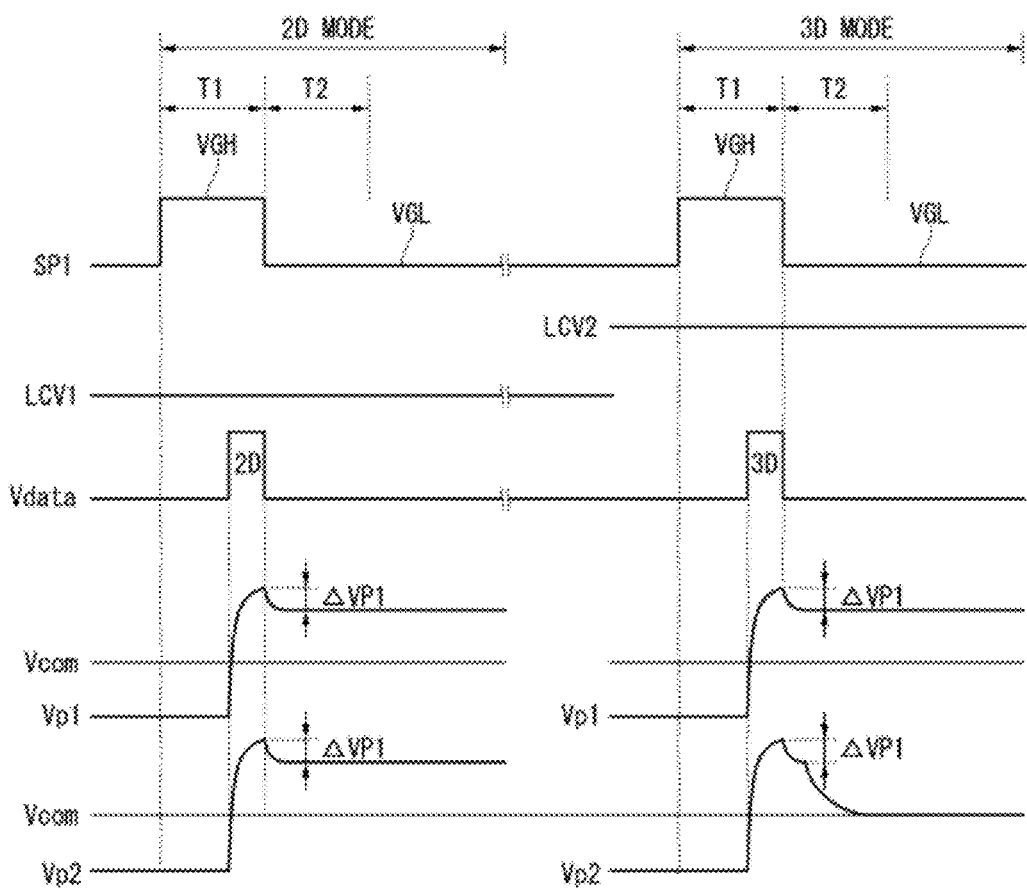
FIG. 9 illustrates charge and discharge waveforms of a red subpixel in each driving mode.
Figure 10:
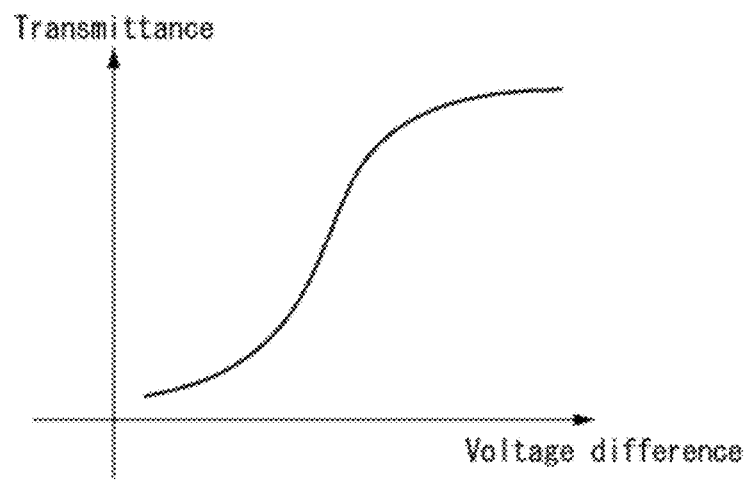
FIG. 10 illustrates a relationship between a transmittance and a voltage difference between a pixel electrode and a common electrode.
Figure 11:
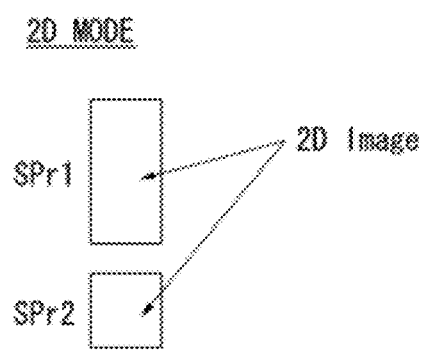
FIG. 11 illustrates a display state of a red subpixel in a 2D mode.
Figure 12:
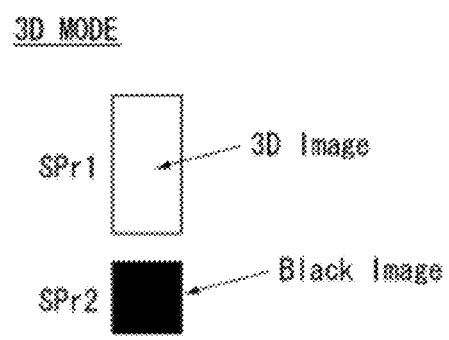
FIG. 12 illustrates a display state of a red subpixel in a 3D mode.
Figure 13:
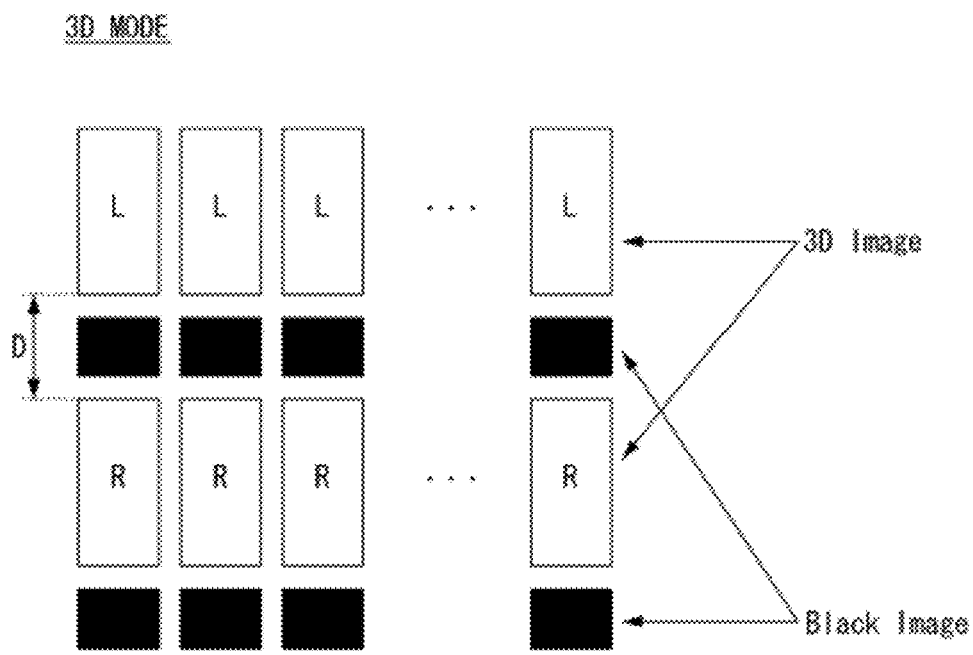
FIG. 13 illustrates that auxiliary display units perform a black stripe function in a 3D mode.

FIG. 8 illustrates in detail a connection configuration of the R subpixel SPr shown in FIG. 5. FIG. 9 illustrates charge and discharge waveforms of the R subpixel SPr in each driving mode. FIG. 10 is a graph illustrating a relationship between a transmittance and a voltage difference between the pixel electrode and the common electrode. FIGS. 11 to 13 illustrate an operation effect depending on the charge waveform shown in FIG. 9. Since connection configurations and operation effects of the G and B subpixels SPg and SPb are substantially the same as the R subpixel SPr, a further description may be briefly made or may be entirely omitted.

As shown in FIG. 8, the R subpixel SPr includes the R main display unit SPr1 and the R auxiliary display unit SPr2 with the first gate line GL1 interposed between them.

The R main display unit SPr1 includes a first pixel electrode Ep1, a first common electrode Ec1 which is opposite to the first pixel electrode Ep1 to constitute a first LC capacitor Clc1, and a first storage capacitor Cst1. The first pixel electrode Ep1 is connected to the first data line DL1 through a first switch ST1. The first switch ST1 is turned on in response to a scan pulse SP1 and thus applies a data voltage Vdata on the first data line DL1 to the first pixel electrode Ep1. A gate electrode of the first switch ST1 is connected to the first gate line GL1, a source electrode of the first switch ST1 is connected to the first data line DL1, and a drain electrode of the first switch ST1 is connected to the first pixel electrode Ep1. The first common electrode Ec1 is connected to the common line CL charged to the common voltage Vcom. The first storage capacitor Cst1 is formed by an overlap of the first pixel electrode Ep1 and the common line CL with an insulating layer interposed between them.

The R auxiliary display unit SPr2 includes a second pixel electrode Ep2, a second common electrode Ec2 which is opposite to the second pixel electrode Ep2 to constitute a second LC capacitor Clc2, and a second storage capacitor Cst2. The second pixel electrode Ep2 is connected to the first data line DL1 through a second switch ST2. The second switch ST2 is turned on in response to the scan pulse SP 1 and thus applies the data voltage Vdata on the first data line DL1 to the second pixel electrode Ep2. A gate electrode of the second switch ST2 is connected to the first gate line GL1, a source electrode of the second switch ST2 is connected to the first data line DL1, and a drain electrode of the second switch ST2 is connected to the second pixel electrode Ep2. The second common electrode Ec2 is connected to the common line CL charged to the common voltage Vcom. The second storage capacitor Cst2 is formed by an overlap of the second pixel electrode Ep2 and the common line CL with an insulating layer interposed between them.

The second pixel electrode Ep2 is connected to the common line CL through the discharge control switch DST. The discharge control switch DST switches on or off a current path between the second pixel electrode Ep2 and the common line CL in selective response to the first DC control voltage LCV1 and the second DC control voltage LCV2. A gate electrode of the discharge control switch DST is connected to the discharge control line CONL, a source electrode of the discharge control switch DST is connected to the second pixel electrode Ep2, and a drain electrode of the discharge control switch DST is connected to the common line CL. When the first DC control voltage LCV1 is applied to the discharge control line CONL, the discharge control switch DST completely closes a source-drain channel of the discharge control switch DST and cuts off the current path between the second pixel electrode Ep2 and the common line CL. When the second DC control voltage LCV2 is applied to the discharge control line CONL, the discharge control switch DST partially opens the source-drain channel of the discharge control switch DST and partially allows the current path between the second pixel electrode Ep2 and the common line CL.

The discharge control switch DST is designed, so that it has the same channel capacitance as the first and second switches ST1 and ST2. Thus, the ON-state of the discharge control switch DST has the slight-on level lower than the full-on level by applying the second DC control voltage LCV2 less than the gate high voltage VGH to the discharge control line CONL. Even if the second switch ST2 and the discharge control switch DST are simultaneously turned on, a channel resistance of the second switch ST2 is greater than a channel resistance of the discharge control switch DST. As a result, an amount of current flowing in the discharge control switch DST is less than an amount of current flowing in the second switch ST2.

An operation and an operation effect of the R subpixel SPr having the above-described connection configuration are described below.

In the 2D mode, the discharge control switch DST is continuously held in the turn-off state in response to the first DC control voltage LCV1 during periods T1 and T2.

During the period T1, the first and second switches ST1 and ST2 are simultaneously turned on at the full-on level in response to the scan pulse SP1, which is input at the same voltage level as the gate high voltage VGH.

The first pixel electrode Ep1 of the R main display unit SPr1 is charged to a first pixel voltage Vp1 as the data voltage Vdata for the display of the 2D image due to the turn-on operation of the first switch ST1. The second pixel electrode Ep2 of the R auxiliary display unit SPr2 is charged to a second pixel voltage Vp2 as the data voltage Vdata for the display of the 2D image due to the turn-on operation of the second switch ST2. Because the first and second switches ST1 and ST2 are designed in the same manner, the second pixel voltage Vp2 is substantially equal to the first pixel voltage Vp1.

During the period T2, the first and second switches ST1 and ST2 are simultaneously turned off in response to the scan pulse SP1, which is input at the same voltage level as the gate low voltage VGL.

The first pixel voltage Vp1, has been charged to the first pixel electrode Ep1 of the R main display unit SPr1 due to the turn-off operation of the first switch ST1, is shifted by ΔVP1 because of an influence of the kick-back voltage and then is held at a shifted voltage level by the first storage capacitor Cst1. The second pixel voltage Vp2, has been charged to the second pixel electrode Ep2 of the R auxiliary display unit SPr2 due to the turn-off operation of the second switch ST2, is shifted by ΔVP1 because of the influence of the kick-back voltage and then is held at a shifted voltage level by the second storage capacitor Cst2.

During the periods T1 and T2, the common voltage Vcom is applied to the first common electrode Ec1 of the R main display unit SPr1 and the second common electrode Ec2 of the R auxiliary display unit SPr2. A difference between the first pixel voltage Vp1 and the common voltage Vcom is substantially equal to a difference between the second pixel voltage Vp2 and the common voltage Vcom. A voltage difference between the pixel electrode and the common electrode and a transmittance have a proportional relationship illustrated in FIG. 10. As a result, as shown in FIG. 11, the R main display unit SPr1 and the R auxiliary display unit SPr2 display the 2D image of the same gray level. The 2D image displayed on the R auxiliary display unit SPr2 functions to increase the luminance of the 2D image.

Figure 14A:
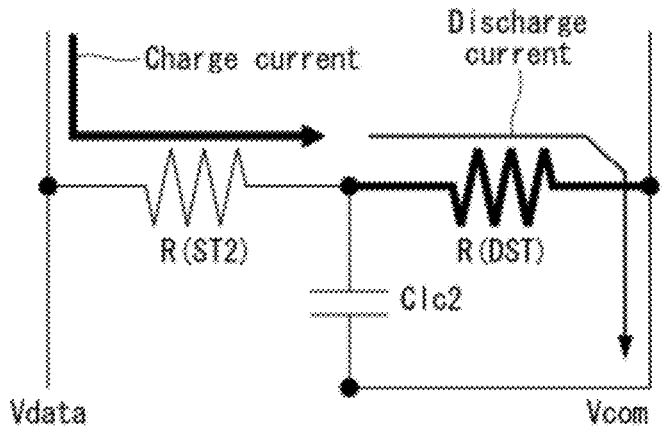
FIG. 14A illustrates relative magnitudes of a charge current and a discharge current during a period T1.
Figure 14B:
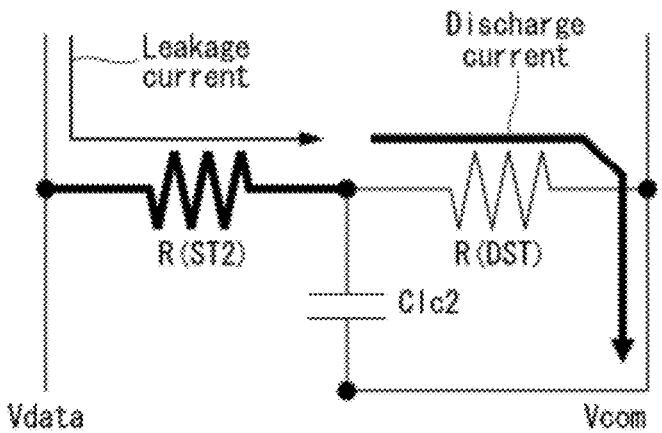
FIG. 14B illustrates relative magnitudes of a charge current and a discharge current during a period T2.

An operation and an operation effect of the R subpixel SPr in the 3D mode are described below with reference to FIGS. 14A and 14B.

In the 3D mode, the discharge control switch DST is continuously held in the ON-state of the slight-on level in response to the second DC control voltage LCV2 during the periods T1 and T2.

During the period T1, the first and second switches ST1 and ST2 are simultaneously turned on at the full-on level in response to the scan pulse SP1, which is input at the same voltage level as the gate high voltage VGH.

The first pixel electrode Ep1 of the R main display unit SPr1 is charged to the first pixel voltage Vp1 as the data voltage Vdata for the display of the 3D image due to the turn-on operation of the first switch ST1. The second pixel electrode Ep2 of the R auxiliary display unit SPr2 is charged to the second pixel voltage Vp2 as the data voltage Vdata for the display of the 3D image due to the turn-on operation of the second switch ST2. As shown in FIG. 14A, during the period T1, a channel resistance R(ST2) of the second switch ST2 having the ON-state of the full-on level is much less than a channel resistance R(DST) of the discharge control switch DST having the ON-state of the slight-on level. Thus, a charge current entering into the second pixel electrode Ep2 is much more than a discharge current releasing from the second pixel electrode Ep2. As a result, because the discharge control switch DST having the ON-state of the slight-on level hardly affects the charge characteristic of the second pixel voltage Vp2 during the period T1, the second pixel voltage Vp2 is charged to the voltage level similar to the first pixel voltage Vp1.

During the period T2, the first and second switches ST1 and ST2 are simultaneously turned off in response to the scan pulse SP1, which is input at the same voltage level as the gate low voltage VGL.

The first pixel voltage Vp1, has been charged to the first pixel electrode Ep1 of the R main display unit SPr1 due to the turn-off operation of the first switch ST1, is shifted by ΔVP1 because of the influence of the kick-back voltage and then is held at a shifted voltage level by the first storage capacitor Cst1. The second pixel voltage Vp2, has been charged to the second pixel electrode Ep2 of the R auxiliary display unit SPr2 due to the turn-off operation of the second switch ST2, is shifted by ΔVP1 because of the influence of the kick-back voltage. Further, as shown in FIG. 14B, the second pixel voltage Vp2 is discharged to the same voltage level as the common voltage Vcom within a predetermined period of time because of the discharge current releasing from the second pixel electrode Ep2. In FIG. 14B, the channel resistance R(DST) of the discharge control switch DST having the ON-state of the slight-on level is much less than the channel resistance R(ST2) of the second switch ST2 having the OFF-state. As a result, the discharge current releasing from the second pixel electrode Ep2 is much more than a leakage current entering into the second pixel electrode Ep2. The second pixel voltage Vp2, whose the discharge has been completed, is not affected by a kick-back voltage ΔVP2 shown in FIG. 16 and is held at the same voltage level as the common voltage Vcom by the second storage capacitor Cst2.

During the periods T1 and T2, the common voltage Vcom is applied to the first common electrode Ec1 of the R main display unit SPr1 and the second common electrode Ec2 of the R auxiliary display unit SPr2. Unlike the difference between the first pixel voltage Vp1 and the common voltage Vcom, a difference between the second pixel voltage Vp2 and the common voltage Vcom becomes substantially zero. As a result, according to the voltage difference-transmittance characteristic illustrated in FIG. 10, as shown in FIG. 12, the R main display unit SPr1 displays the 3D image of a predetermined gray level and the R auxiliary display unit SPr2 displays the 3D image of a black gray level. Thus, the R auxiliary display unit SPr2 serves an active black stripe.

As shown in FIG. 13, the black image displayed on the R auxiliary display unit SPr2 increases a display distance D between the 3D images (i.e., between the left eye image L and the right eye image R), which are adjacent to each other in a vertical direction. Hence, the 3D vertical viewing angle, at which a crosstalk is not generated, may be widely secured through the black image without a separate black stripe pattern.

Figure 15:
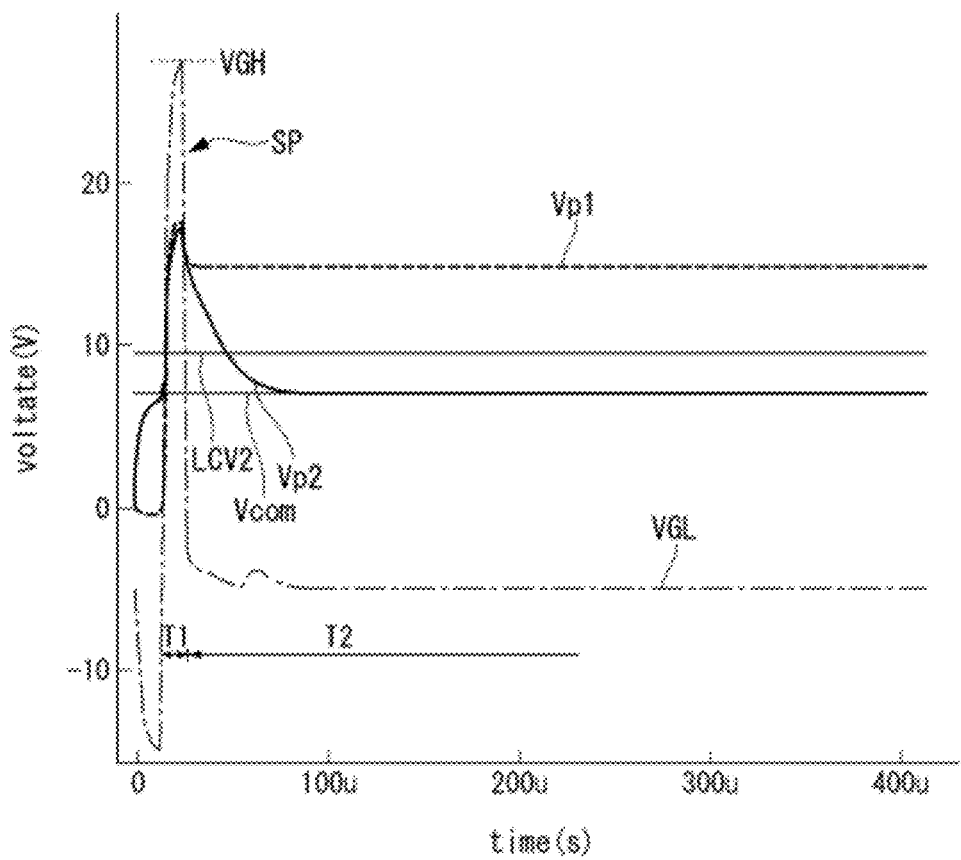
FIG. 15 illustrates a simulation result in a 3D mode.

FIG. 15 illustrates a simulation result in the 3D mode.

In the simulation result illustrated in FIG. 15, the second DC control voltage LCV2 of about 10V was selected between the gate high voltage VGH of about 28V and the common voltage Vcom of about 7.5V. In this instance, according to the embodiment of the invention, the second pixel voltage Vp2, whose the discharge has been completed during the period T2, may be held at the same voltage level as the common voltage Vcom without being affected by the kick-back voltage, while not reducing the charge characteristic of the second pixel voltage Vp2 during the period T1 (i.e., while the second pixel voltage Vp2 is charged to the voltage level similar to the first pixel voltage Vp1 during the period T1).

Figure 16:
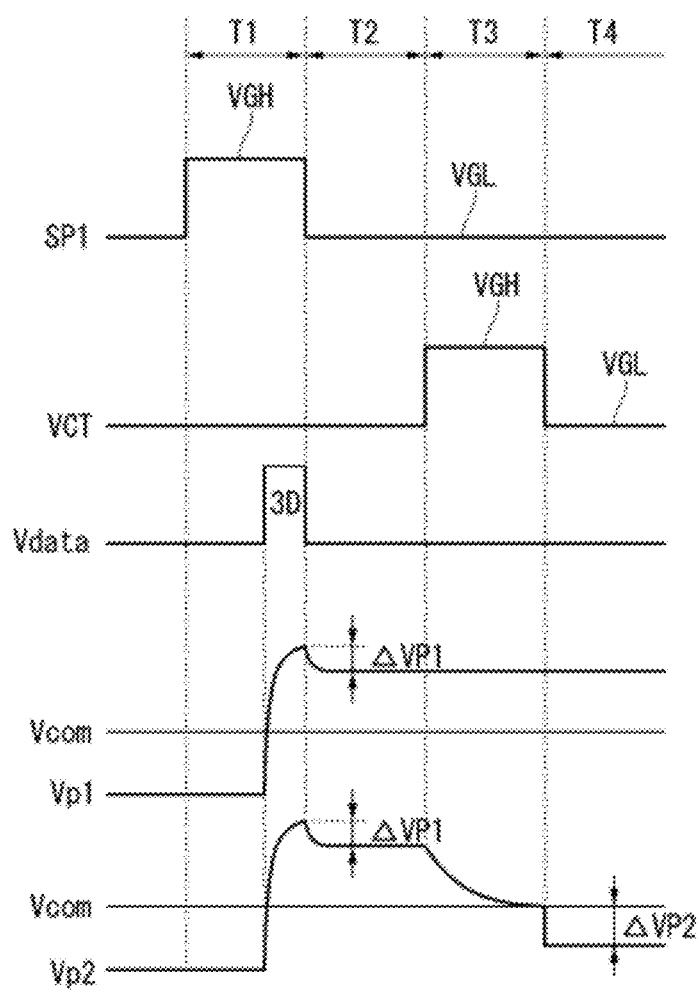
FIGS. 16 to 18 illustrate side effects when a control voltage of a pulse form is applied to a gate electrode of a discharge control switch based on a subpixel circuit shown in FIG. 8 in a 3D mode.
Figure 17:
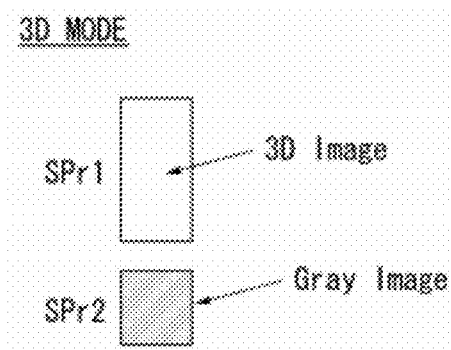
Figure 18:
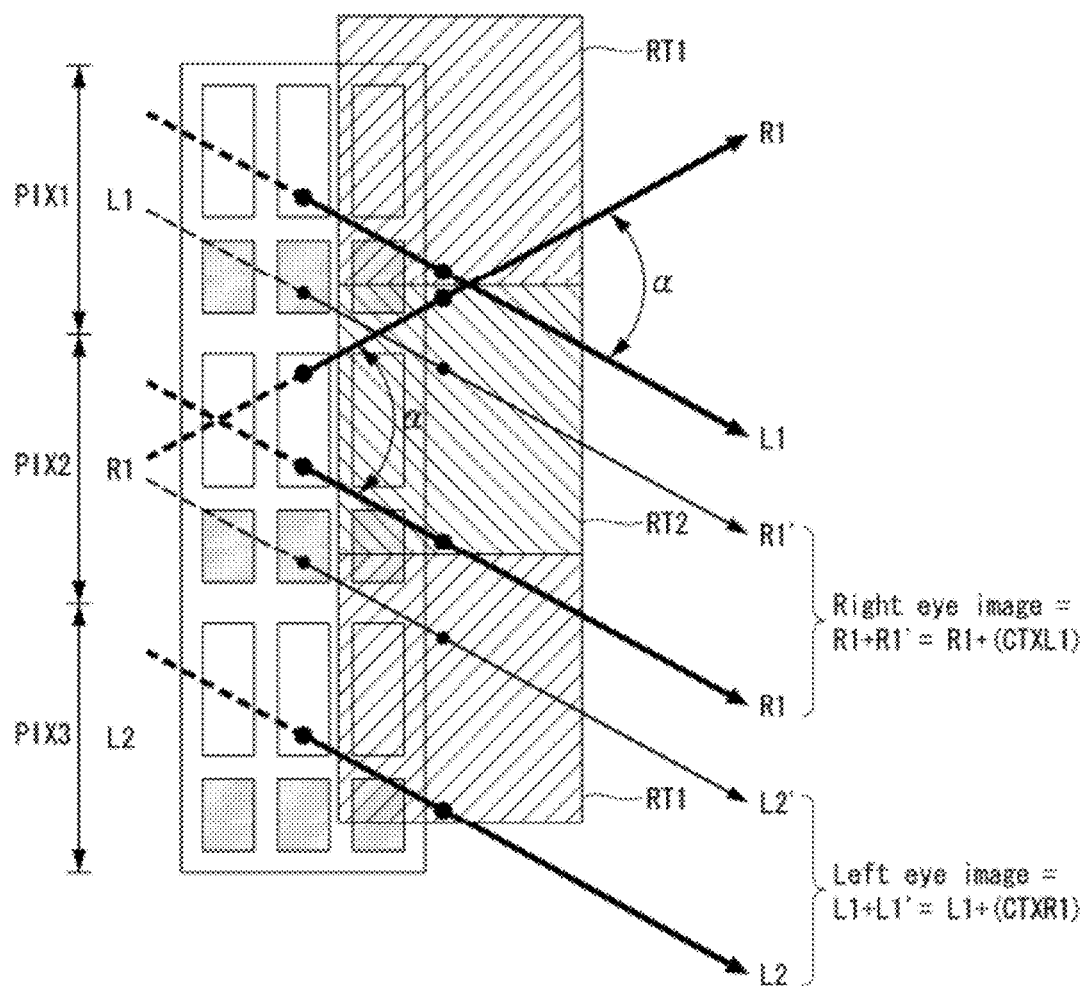

FIGS. 16 to 18 illustrate side effects generated when a control voltage of a pulse form is applied to the gate electrode of the discharge control switch based on the subpixel circuit shown in FIG. 8 in the 3D mode.

Unlike the waveform illustrated in FIG. 9 according to the embodiment of the invention, as shown in FIG. 16, a control voltage VCT of a pulse form is applied. Namely, the control voltage VCT having the same voltage level as the gate high voltage VGH is applied only during a period T3, and the control voltage VCT having the same voltage level as the gate low voltage VGL is applied during remaining periods T1, T2, and T4.

Unlike the embodiment of the invention, in the waveform illustrated in FIG. 16, the second pixel voltage Vp2 is not held at the discharge voltage level (i.e., the level of the common voltage Vcom) and is shifted below the common voltage Vcom by ΔVP2 because of the influence of the kick-back voltage at a time (i.e., converted from the period T3 to the period T4) when the discharge control switch is converted from the turn-on state to the turn-off state. According to the voltage difference-transmittance characteristic illustrated in FIG. 10, as the voltage difference increases, the transmittance increases. Therefore, as shown in FIG. 17, the auxiliary display unit SPr2, which has to display the black image during the period T4, transmits light corresponding to the voltage shift amount ΔVP2 and displays a gray image.

As shown in FIG. 18, when the auxiliary display units do not serve as the black stripe in the 3D mode, a leakage light L1 of the left eye image passes through the second retarder RT2 and is mixed with the right eye image R1. In other words, the leakage light L1 of the left eye image corresponds to an interference amount R1' of right circularly polarized light and is mixed with the right eye image. Further, a leakage light R1 of the right eye image passes through the first retarder RT1 and is mixed with the left eye image L2. In other words, the leakage light R1 of the right eye image corresponds to an interference amount L2' of left circularly polarized light and is mixed with the left eye image L2. Because the leakage light L1 and the leakage light R1 cause the 3D crosstalk, it is difficult to widen the vertical viewing angle α of the 3D image in the waveform illustrated in FIG. 16.

As described above, the image display device according to the embodiment of the invention divides each subpixel into the main display unit and the auxiliary display unit and controls the discharge control switch using the control voltage of the DC level so that the auxiliary display unit serves as the active black stripe. Hence, the image display device according to the embodiment of the invention can secure the wider vertical viewing angle of the 3D image without a reduction in the luminance of the 2D image.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An image display device comprising:
a display panel configured to selectively display a 2D image and a 3D image, the display panel including a plurality of subpixels;
a patterned retarder configured to divide light from the display panel into first polarized light and second polarized light; and
a control voltage generator configured to generate a first DC control voltage of an OFF-level and a second DC control voltage of a slight-on level, which is higher than the OFF-level and is lower than a full-on level, and selectively output the first DC control voltage and the second DC control voltage depending on a driving mode,
wherein each of the plurality of subpixels includes:
a main display unit including a first pixel electrode connected to a data line through a first switch and a first common electrode which is opposite to the first pixel electrode and is connected to a common line; and
an auxiliary display unit including a second pixel electrode connected to the data line through a second switch, a second common electrode which is opposite to the second pixel electrode and is connected to the common line, and a discharge control switch which selectively connects the second pixel electrode to the common line depending on the driving mode,
wherein the discharge control switch is turned off by the first DC control voltage in a 2D mode for implementing the 2D image and is slightly turned on by the second DC control voltage in a 3D mode for implementing the 3D image, and
wherein the control voltage generator is configured to maintain the first DC control voltage in an entirety of the 2D mode and the second DC control voltage in an entirety of the 3D mode.

2. The image display device of claim 1, wherein the display panel further includes a discharge control line to which the first DC control voltage and the second DC control voltage are selectively applied,
wherein the discharge control switch has a gate electrode connected to the discharge control line, a source electrode connected to the second pixel electrode, and a drain electrode connected to the common line charged to a common voltage.

3. The image display device of claim 2, wherein the discharge control switch blocks a current path between the second pixel electrode and the common line in the 2D mode,
wherein the discharge control switch allows the current path between the second pixel electrode and the common line in the 3D mode and discharges the second pixel electrode so that a voltage charged to the second pixel electrode converges at the same voltage level as the common voltage.

4. The image display device of claim 2, wherein the second DC control voltage of the slight-on level is greater than the common voltage.

5. The image display device of claim 1, wherein the first switch and the second switch are connected to the same gate line and are simultaneously turned on and off in response to a scan pulse applied to the same gate line.

6. The image display device of claim 1, wherein as a voltage difference between the first pixel electrode and the first common electrode of the main display unit increases, a transmittance of the main display unit increases, wherein as a voltage difference between the second pixel electrode and the second common electrode of the auxiliary display unit increases, a transmittance of the auxiliary display unit increases.

7. The image display device of claim 6, wherein the main display unit and the auxiliary display unit display the same 2D image in the 2D mode, wherein the main display unit displays the 3D image and the auxiliary display unit displays a black image in the 3D mode.

8. The image display device of claim 2, wherein the control voltage generator includes:

a DC-DC generator configured to generate the first DC control voltage and the second DC control voltage using an input DC power source; and a multiplexer configured to selectively output the first DC control voltage and the second DC control voltage to the discharge control line in response to a mode selection signal.

* * * * *